United States Patent
Takeshita et al.

(10) Patent No.: US 7,326,880 B2
(45) Date of Patent: Feb. 5, 2008

(54) WELDING TORCH AND WELDING ROBOT

(75) Inventors: Satoshi Takeshita, Fukuoka (JP);
Takashi Sanada, Fukuoka (JP);
Atsushi Ichibangase, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/558,826

(22) PCT Filed: May 26, 2004

(86) PCT No.: PCT/JP2004/007183

§ 371 (c)(1),
(2), (4) Date: Nov. 29, 2005

(87) PCT Pub. No.: WO2004/105991

PCT Pub. Date: Dec. 9, 2004

(65) Prior Publication Data

US 2007/0017910 A1 Jan. 25, 2007

(30) Foreign Application Priority Data

May 30, 2003 (JP) ............................. 2003-155304

(51) Int. Cl.
*B23K 9/12* (2006.01)
(52) U.S. Cl. ............................. 219/137.62; 219/124.34

(58) Field of Classification Search ............. 219/125.1, 219/124.34, 137.62; 901/42
See application file for complete search history.

(56) References Cited

U.S. PATENT DOCUMENTS 4,515,521 A 5/1985 Takeo et al.

FOREIGN PATENT DOCUMENTS

| GB | 2 285 404 A | * | 7/1995 |
| JP | 60-32546 B | | 7/1985 |
| JP | 60-32546 B2 | * | 7/1985 |
| JP | 1-157775 A | * | 6/1989 |
| JP | 5-47313 B2 | | 7/1993 |
| JP | 9-94663 | * | 4/1997 |
| JP | 9-94663 A | | 4/1997 |
| JP | 11-198088 A | | 7/1999 |
| JP | 2976692 B2 | | 11/1999 |
| JP | 2003-94768 A | | 4/2001 |

* cited by examiner

*Primary Examiner*—Kevin P. Kerns
(74) *Attorney, Agent, or Firm*—Sughrue Mion, PLLC

(57) ABSTRACT

A welding torch having a flange portion to be coupled to a wrist of a robot. A shock sensor is attached to the flange portion. A nozzle is attached to the shock sensor. The welding torch includes a wire feeding pipe socket arranged at a center of the flange portion. A cooling pipe socket is arranged at a position offset from a central portion of the flange portion. A cooling hose for feeding cooling water from the flange portion to the nozzle is provided while bypassing the shock sensor.

3 Claims, 3 Drawing Sheets

WELDING TORCH AND WELDING ROBOT

TECHNICAL FIELD

The present invention relates to a water-cooled welding torch and a welding robot.

BACKGROUND ART

There is known a welding robot having an arc welding torch attached to a wrist portion of an industrial robot of a vertical articulated type (as referred to Patent Publication 1, for example), as shown in FIG. 3.

In FIG. 3, numeral 1 indicates an industrial robot of a vertical articulated type, and numeral 2 indicates an upper arm portion thereof. A wrist portion 3 is attached to the tip end of the upper arm portion 2. The wrist portion 3 swings on a wrist swinging axis 4 (in directions of an arrow A), and pivots around a wrist pivoting axis 5 (in directions of an arrow B). A welding torch 7 is attached to the wrist portion 3 through a mounting member 6. The welding torch 7 is provided with a shock sensor 8 and a nozzle 9. A wire feeding device 10 is provided at the back portion of the upper arm portion 2, and feeds a welding wire to the welding torch 7 through a conduit cable 11 and a cooling water to the welding torch 7 through a cooling water hose 12, respectively.

Patent Publication 1: JP-A-9-94663

DISCLOSURE OF THE INVENTION

Problems that the Invemtion is to Solve

However, in the welding torch and the welding robot of the related art, the conduit cable 11 and the cooling water hose 12 are spanned over the upper arm portion 2. Therefore, the conduit cable 11 and the cooling water hose 12 moves within a range of an interference region 13 as the wrist portion 3 swings/pivots, so that a problem is arisen that they interfere with working objects or peripheral devices.

Therefore, an object of the invention is to provide a welding torch and a welding robot in which a conduit cable and a cooling water hose do not interfere with peripheral devices or the like.

Means for Solving the problems

In order to solve the aforementioned problems, an aspect of the present invention is a welding torch having a flange portion to be coupled to a wrist of a robot, a shock sensor attached to the flange portion, and a nozzle attached to the shock sensor, the welding torch comprising: a wire feeding pipe socket arranged at a center of the flange portion; a cooling pipe socket arranged at a position offset from a central portion of the flange portion; and a cooling hose for feeding cooling water from the flange portion to the nozzle while bypassing the shock sensor.

Moreover, in a further enhancement a welding wire and the cooling water are fed to the welding torch through the hollow wrist portion.

Advantages of the Invention

According to the invention, as has been described hereinbefore, the conduit cable and the cooling water hose can be connected to the welding torch through the hollow wrist portion of the robot, so that the conduit cable and the like do not go out of the upper arm portion thereby to prevent the interference between the conduit cable and the like and the peripheral devices and the like.

Moreover, as the conduit cable and the like do not contact with the peripheral devices and the like, the conduit cable and the like are prevented from being damaged.

DESCRIPTION OF REFERENCE NUMERALS AND SIGNS

1: Industrial Robot, 2: Upper Arm Portion, 3: Wrist Portion, 4: Wrist Swinging Axis, 5: Wrist Pivoting Axis, 6: Mounting Member, 7: Welding Torch, 8: Shock Sensor, 9: Nozzle, 10: Wire Feeding Device, 11: Conduit Cable, 12: Cooling Water Hose, 13: Interference Region, 21: Welding Torch, 22: Flange Portion, 23: Shock Sensor, 24: Nozzle, 25: Wire Feeding Pipe Socket, 26: Cooling Pipe Socket, and 27: Cooling Hose

BEST MODE FOR CARRYING OUT THE INVENTION

Embodiments of the invention are described in the following with reference to the accompanying drawings.

Embodiment 1

Figure 1:
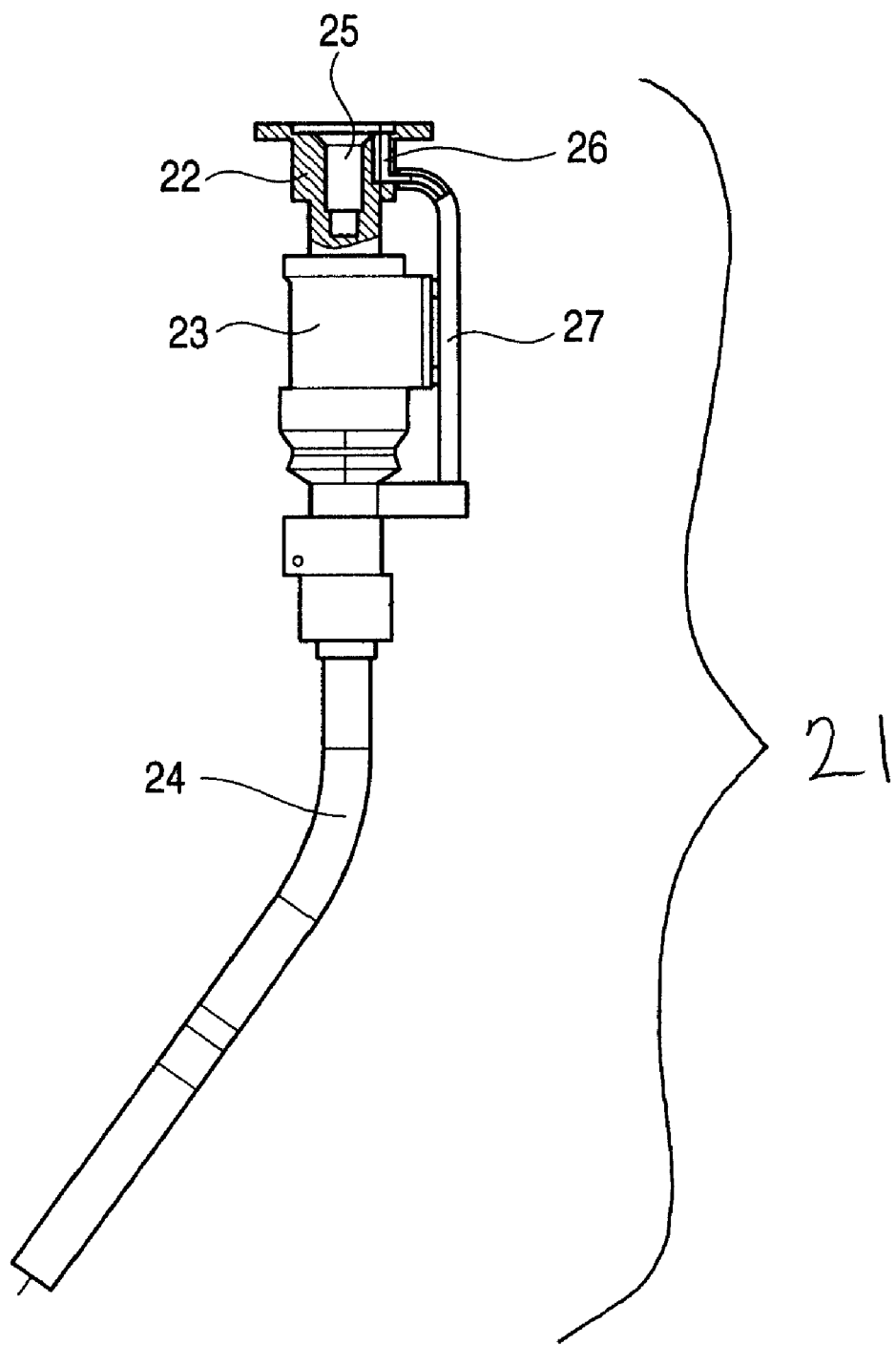
FIG. 1 is an exterior view of a welding torch showing a first embodiment of the invention.

FIG. 1 is an exterior view of a welding torch showing a first embodiment of the invention. In the Figure, numeral 21 indicates a welding torch of the invention. The welding torch 21 is configured with a flange portion 22, a shock sensor 23 and a nozzle 24, which are coupled in this order. The flange portion 22 is functioning as a coupling portion to be coupled with a wrist portion of the welding robot. The flange portion 22 is provided with a wire feeding pipe socket 25 at its center, and a conduit cable (not shown) is coupled so that a welding wire (not shown) and a shield gas are fed to the nozzle 24 through a central portion of the shock sensor 23. At a position offset from the center of the flange portion 22, a cooling pipe socket 26 is disposed so that a cooling water hose (not shown) is coupled thereto and the cooling water is fed. The cooling water, entering the flange portion 22, enters a cooling hose 27 from the side face of the flange portion 22, which is fed to the nozzle 24 while bypassing the shock sensor 23.

Here, the shock sensor 23 is a sensor for detecting a collision, if any, of the nozzle 24 against a foreign object thereby to stop the robot.

Figure 2:
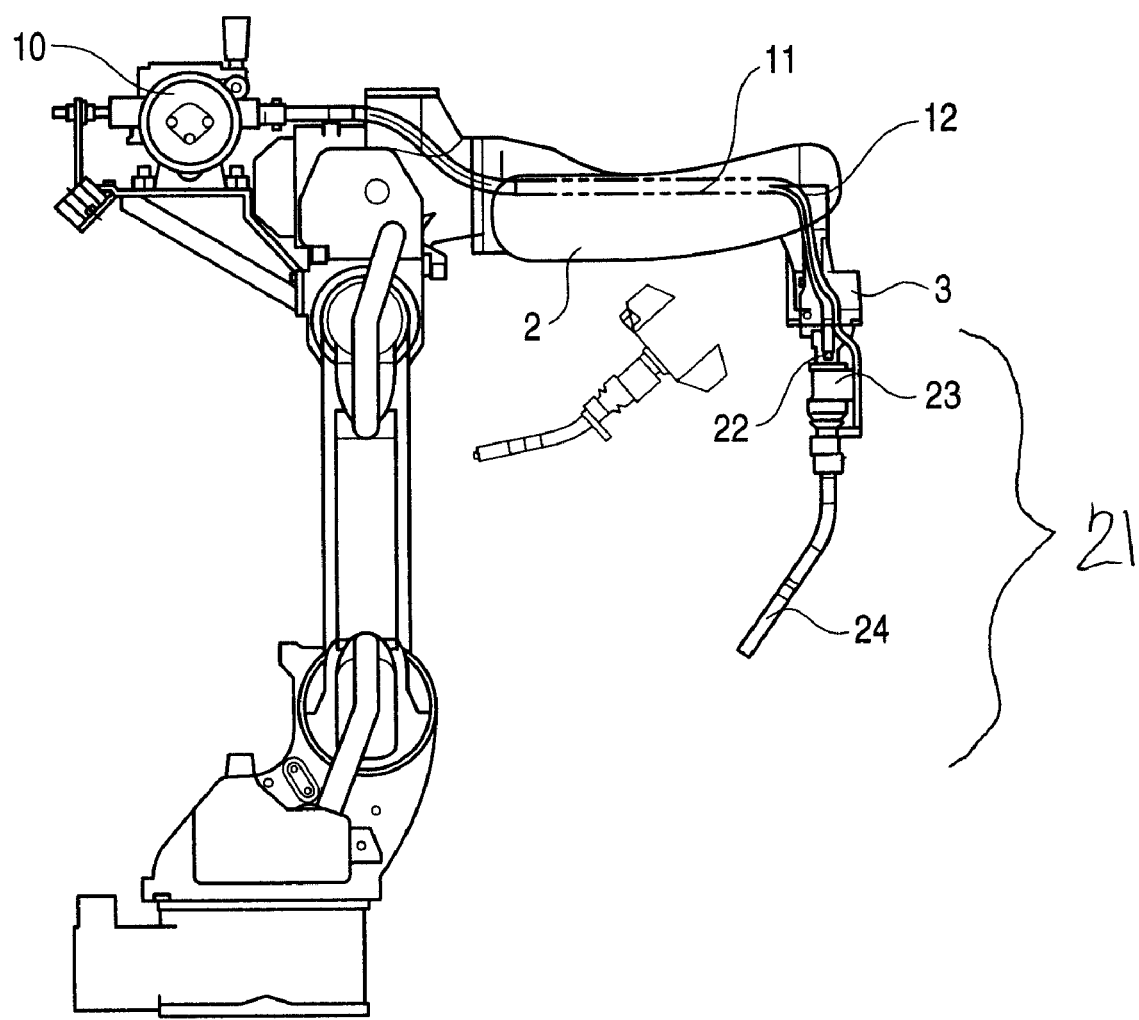
FIG. 2 is an exterior view of a welding robot showing a second embodiment of the invention.
Figure 3:
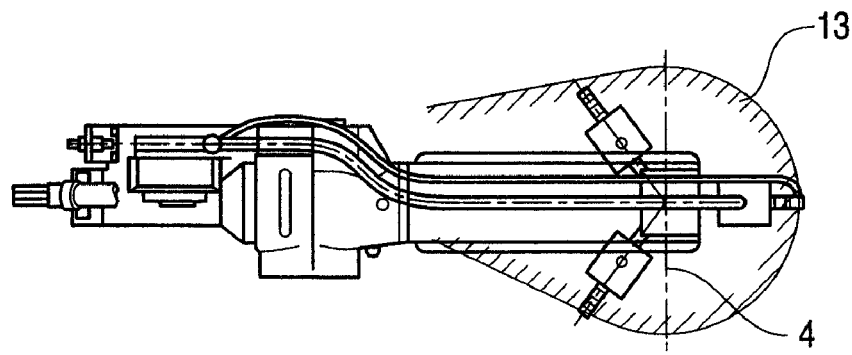
FIG. 3 is an exterior view of a welding robot showing an example of the related art, and (a) is a top plan view and (b) is an elevational view.
Figure 3:
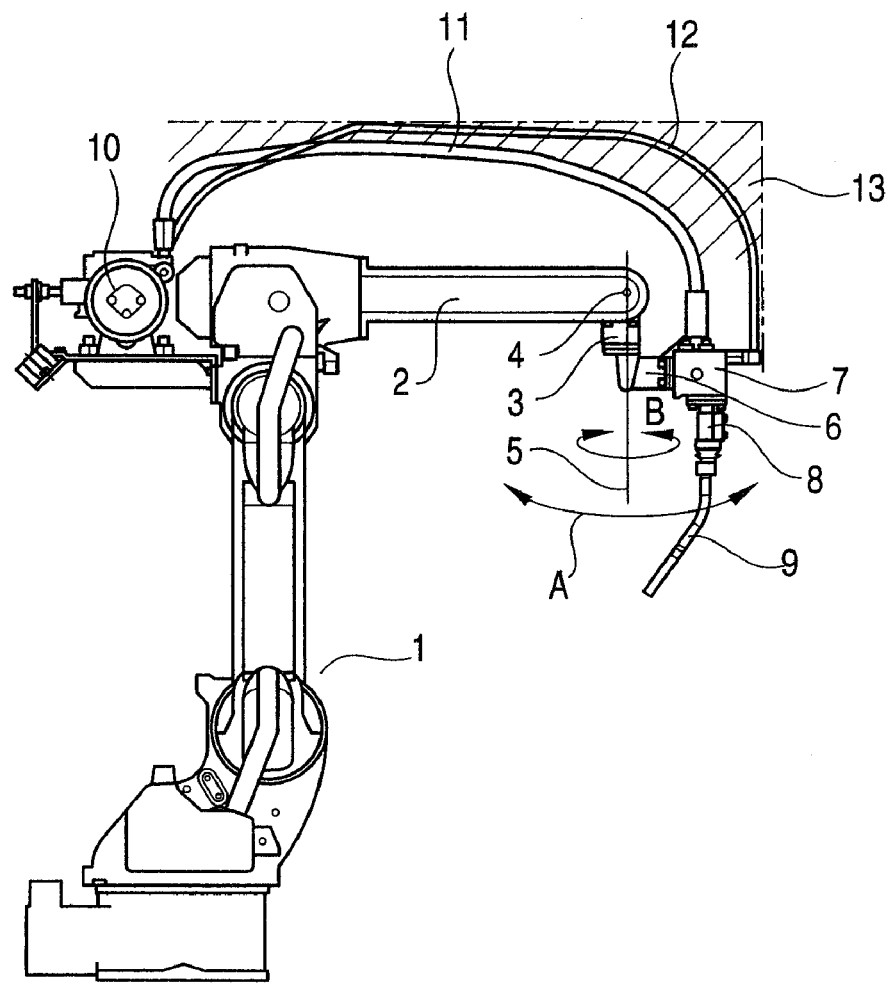

FIG. 2 is an exterior view of a welding robot showing a second embodiment of the invention, and shows a state in which the welding torch 21 shown in FIG. 1 is attached to an industrial robot 1.

A conduit cable 11 and a cooling water hose 12 extend from a wire feeding device 10 attached to the back end of an upper arm portion 2, enters inside the upper arm portion 2, and are arranged up to a wrist portion 3. The wrist portion 3 is provided with a hollow portion, through which the conduit cable 11 and the cooling water hose 12 are connected to the welding torch 21.

Thus, the conduit cable 11 and the cooling water hose 12 extend to the welding torch 21 without being disposed outside of the upper arm portion 2, so that the conduit cable 11 and something arranged therewith do not interfere with the peripheral devices and the like.

INDUSTRIAL APPLICABILITY

The present invention can be applied especially to the water-cooled welding torch and the welding robot, and can be utilized in the field for providing the water-cooled welding torch and the welding robot, in which the conduit cable and the cooling water hose are connected to the welding torch through the hollow wrist portion of the robot so that the conduit cable and the like do not go out of the upper arm portion thereby to prevent the interference between the conduit cable and the like and the peripheral devices and the like.

The invention claimed is:

1. A welding torch having a flange portion to be coupled to a wrist of a robot, a shock sensor attached to the flange portion, and a nozzle attached to the shock sensor, said welding torch comprising:

a wire feeding pipe socket arranged at a center of said flange portion;

a cooling pipe socket arranged in said flange portion at a position offset from a central portion of said flange portion; and a cooling hose for feeding cooling water from said flange portion to said nozzle while bypassing said shock sensor, said cooling hose passing through said cooling pipe socket.

2. A welding robot having the welding torch as claimed in claim 1 at a hollow wrist portion thereof, wherein a welding wire and the cooling water are fed to said welding torch through said hollow wrist portion.

3. The welding robot as claim in claim 2, further comprising:

a wire feeding device attached to the back end of an upper arm portion of the welding robot, wherein the welding wire and the cooling hose extends from the wire feeding device, enters inside the upper arm portion, passes through a hollow portion of the hollow wrist portion, and is connected to the welding torch.

* * * * *